United States Patent [19]
McMaster

[11] 3,867,779
[45] Feb. 25, 1975

[54] HOOK SETTING APPARATUS
[76] Inventor: Emery D. McMaster, 1309 Highland Dr., Petoskey, Mich. 49770
[22] Filed: Nov. 5, 1973
[21] Appl. No.: 412,686

[52] U.S. Cl. .................................. 43/15, 43/44.9
[51] Int. Cl. .......................................... A01k 97/00
[58] Field of Search ................. 43/15, 16, 19, 44.9

[56] References Cited
UNITED STATES PATENTS

| | | | |
|---|---|---|---|
| 1,272,272 | 7/1918 | Kell | 43/44.9 |
| 2,177,912 | 10/1939 | Spitz et al. | 43/15 |
| 2,776,514 | 1/1957 | Kinder | 43/16 |
| 2,799,111 | 7/1957 | Voboril | 43/15 |
| 2,810,981 | 10/1957 | Littau | 43/16 |
| 2,824,404 | 2/1958 | Booth | 43/15 |
| 2,851,812 | 9/1958 | Beck | 43/15 |
| 2,984,039 | 5/1961 | Willey | 43/15 |

Primary Examiner—Warner H. Camp

[57] ABSTRACT

A hook setting apparatus releases a fishing rod from a flexed position in response to a pulling force applied to the fishing line. The apparatus comprises a releasable control arm disposed in an eyelet at the distal end of the rod and an adjustable line adapted for interconnecting the arm and the terminal end of the rod. The rod is selectively bowed in response to tightening the adjustable line and the control arm is released from the eyelet in response to a tensile force applied to the fishing line whereby the resulting spring-back of the rod sets the fish hook.

5 Claims, 4 Drawing Figures

PATENTED FEB 25 1975 3,867,779
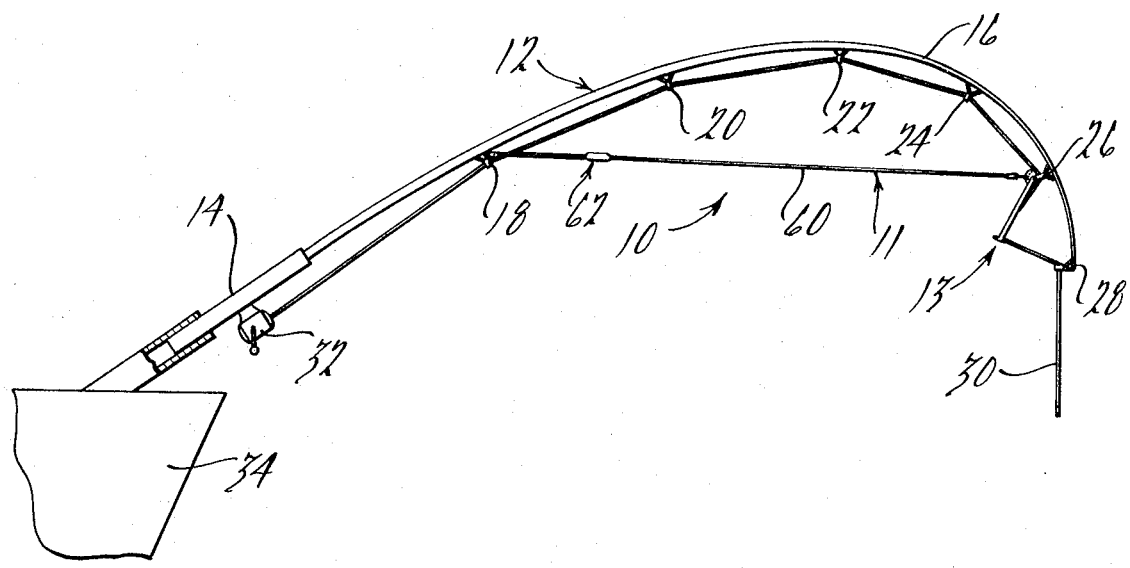
FIG. 1.
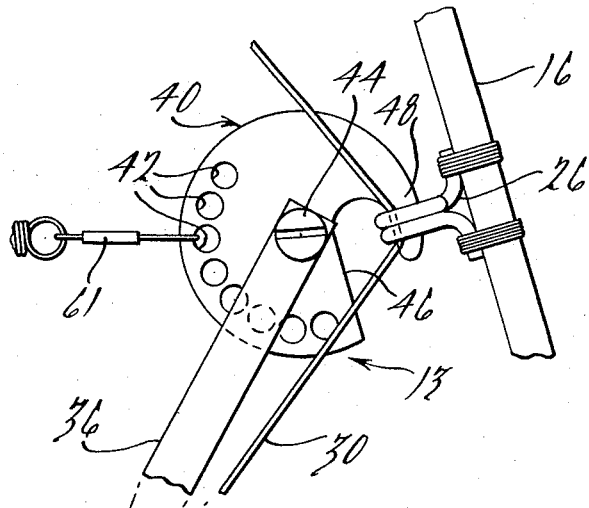
FIG. 2.
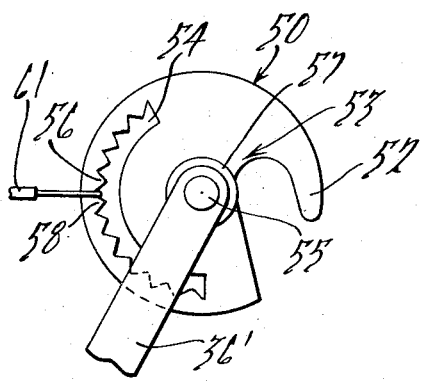
FIG. 3.
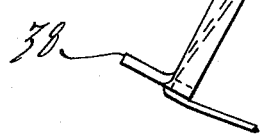
FIG. 4.
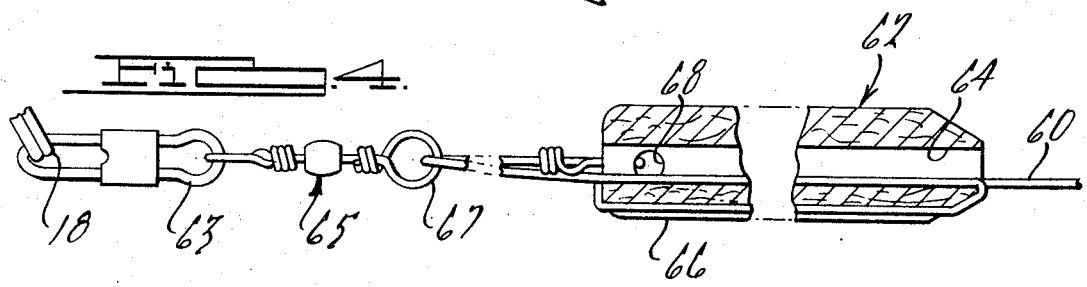

HOOK SETTING APPARATUS

BACKGROUND AND SUMMARY OF THE INVENTION

The present invention relates generally to the art of sport fishing, and more particularly to a new and improved apparatus for automatically setting a fish hook of an unattended fishing rod.

In the present invention, an automatic hook setting device is disclosed which is adapted to be operatively attached to virtually any type of fishing rod and which includes connecting means for applying a bending force to the rod whereby to maintain the rod in a bowed or flexed position and actuating means responsive to a pulling force applied to the fishing line for triggering or releasing the connecting means to set the fish hook. The actuating means is adjustable to provide any desired degree of sensitivity relative to the triggering or release point of the apparatus. The connecting means is also adjustable with respect to the magnitude of the bending force to be applied to the rod thereby controlling the resulting spring back. It is, therefore, a general object of the present invention to provide a hook setting apparatus which is attachable and operable with virtually all types of fishing rods thereby providing universality of application and which is adjustable to accommodate various fishing experiences.

The connecting means of the present invention is comprised of an adjustable line interconnecting the terminal and distal ends of the fishing rod and the actuating means is comprised of a releasable control mechanism responsive to a pulling force applied to the fishing line. In view of the minimal number of components, the apparatus is of extremely simple design and construction whereby it can be marketed at a very economical price relative to most hook setting devices presently available. It, therefore, is another object of the present invention to provide a hook setting device which is of extremely simple design and construction whereby it can be marketed at a price below hook setting devices presently commercially available.

In the present invention, during periods when the apparatus is operatively installed on a fishing rod, the fishing line can be adjusted to provide more or less slack at the discretion of the fisherman without inadvertently triggering the control mechanism. Moreover, since the release point of the control mechanism is also adjustable, the apparatus can be reliably operated in extremely windy conditions. It, therefore, is a further object of the present invention to provide a hook setting apparatus which is extremely flexible in operation and which is adjustable to accommodate virtually any environment.

Other objects, features and advantages of the present invention will become apparent from the subsequent description and the appended claims, taken in conjunction with the accompanying drawings.

BRIEF DESCRIPTION OF THE DRAWINGS

FIG. 1 is a side elevational view of a hook setting apparatus in accordance with a preferred embodiment of the present invention illustrated in operative relationship to an exemplary fishing rod;

FIG. 2 is an enlarged fragmentary view of the release mechanism comprising a portion of the apparatus illustrated in FIG. 1;

FIG. 3 is an enlarged fragmentary view of a second release mechanism in accordance with another preferred form of the present invention; and FIG. 4 is an enlarged cross-sectional view of a preferred form of a line adjusting means in accordance with a preferred embodiment of the apparatus illustrated in FIG. 1.

DETAILED DESCRIPTION OF THE PREFERRED EMBODIMENT

With reference now to FIG. 1 of the drawings, a hook setting apparatus in accordance with a preferred embodiment of the subject invention is indicated generally at 10. As illustrated herein, the apparatus 10 is operatively connected to an exemplary fishing pole which, by way of example, can be comprised of a handle portion 14 and an elongated rod portion 16 which extends longitudinally outwardly therefrom. The rod portion 16 includes a plurality of longitudinally spaced eyelets or guide members 18, 20, 22, 24, 26, and 28 which are adapted to support an extensible section of a fishing line 30. The pole 12 also can include a suitable reel assembly 32 which can be fixedly connected to the handle 14 and adapted for extending or withdrawing the fishing line 30 as is conventional in the art. In order that the pole 12 can be unattended, the handle 14 is disposed in a suitable pole or rod holder 34 which can be of any commercially available and conventional type. The holder 34 and pole 12 form no part of the present invention and are described herein merely for purposes of illustrating a typical operative and peripheral environment of the present invention.

Generally speaking, the apparatus 10 of the present invention comprises a flexing means 11 adapted to selectively maintain the rod portion 16 in a bowed condition and actuating or triggering means 13 for releasing the flexing means 11 in response to a pulling force applied to the fishing line 30. More particularly, and as best seen in FIG. 2, the release or triggering means 13 comprises a control arm 36 having a fork-like or bifurcated end section 38 folded perpendicularly relative to the axis of the arm 36. An opposite end of the arm 36 is adjustably connected to a disc-shaped detent 40 which includes a plurality of circumferentially spaced apertures 42, one of which is adapted to be fixedly connected to the flexing means 11 whereby to provide an adjustable release or triggering means as shall hereinafter become apparent. The detent 40 also includes an inwardly extending slot or recess 46 which defines an outwardly and circumferentially extending hook or end tab 48 adapted to detachably engage one of the guides or eyelets 26. The opposite end of the control arm 36 is connected to the detent 40 by suitable fastener means such as a set screw 44 which permits the inclination of the arm 36 to be adjusted whereby to preclude an interference between the rod 16 and the control arm 36 during pivotal movement thereof and which shall hereinafter be more fully described in conjunction with the operation of the apparatus 10.

Another preferred form of the detent 40 is illustrated in FIG. 3 and indicated by the numeral 50. In this embodiment, the detent 50 includes a hook or end tab portion 52 which can be identical to the tab 48 of the prior embodiment and a circumferentially extending, arcuately shaped slot or passage 54 having a plurality of serrations located along an outer circumferential surface which are adapted to function in an analogous manner as the plurality of apertures 42. The detent 50 is connected to a control arm, designated at 36', by a fastener means 53 which preferably comprises a loosely fitting rivet 55 and an annular shaped spring washer 57. The above described connection permits the arm 36' to be angularly adjusted relative to the detent 50 and obviates the need of tightening, loosening, and adjusting a threaded fastener. The angular position of the detent 50 relative to the longitudinal axis of the pole 12 is controllable by selectively locating an end portion of the flexing means between adjacent pairs of serrations, such as adjacently located serrations indicated at 56 and 58 respectively. To alter the angular position and correspondingly the release point of the detent 50, the other pairs of adjacent serrations can be utilized to selectively position the end tab 52 in a selective angular position relative to the guides 26 whereby the release or detaching point of the tab 52 is subject to provide a degree of sensitivity with respect to the degree of pivotal movement required for detachment.

In the present invention the flexing means comprises a flexible line or cable 60 connected at one end via a swivel fastener 61 to the detent 40 (or 50) as described above, and an opposite end to a slidable adjustment member 62. As best seen in FIG. 4, the member 62 includes a centrally located, longitudinally extending passage 64 and a longitudinally extending slot or groove 66 located about an outer peripheral surface thereof. A radially extending slot 68 communicates the centrally located passage 64 and is utilized to fixedly secure one end of the cable 60 thereto. The cable 60 is looped around an eyelet 67 of a swivel fastener 65 connected to the guide 18 via a detachable connector 63. The cable 60 extends through the passage 64 via a looped arrangement which includes passing a portion of the cable through the slot 66 whereby a double portion of cable is disposed in the passage 64. In response to slidable movement of the member 62, the cable 60 is shortened or lengthened and accordingly the degree of flexure to the rod 16 is selectively controllable.

To operatively set-up the apparatus 10, the pole 12 can be initially positioned in the holder 34 or the apparatus 10 can be attached to the pole 12 and thereafter be disposed in the holder 34. In accordance with the desired spring-back to be provided and the degree of triggering sensitivity to be provided the detent 40 (or 50) for actuation to set the hook, the apparatus 10 is preferably selectively positioned and adjusted in the following manner. Initially, the reel 32 is set to provide a brake tension on the fishing line 30 to preclude longitudinal movement relative to the pole 12. The detent 40 (or 50) is disposed in the first guide 26 nearest the rod tip 28 with the open end of the slot 46 projecting toward the distal end of the pole 12. One end of the cable 60 is looped through the eyelet 67 of the swivel fastener 65 and connected to the member 62 in accordance with the arrangement previously described. The fastener 65 is connected to the first guide 18 nearest the terminal end of the pole 12 by means of the detachable connector 63 and the swivel fastener 61 at an opposite end is disposed in a selective aperture 42 (or between adjacent serrations 56 and 58) in the detent in accordance with the preselected sensitivity of the release point to be provided. The member 62 is then slidably adjusted to selectively flex the pole 12 to provide a springback force to be utilized in setting the hook. Since the detent 40 (or 50) requires a certain degree of pivotal or angular movement to detach and in view of the fact that the control arm 36 dictates the traversal of the detent 40, the initial inclination of the arm 36 must be initially set to provide the required angulation without obstruction from the pole 12. In this regard, the set screw 44 is loosened to permit the arm 36 to be angularly adjusted so that the detent 40 (or 50) releases slightly before the arm 36 contacts the distal end of the rod 16. It will be noted that all three of the adjustments described are made in relative relation with one another, but once all of the adjustments have been accomplished, no re-adjustment is required for subsequent hook setting cycles. A slackened portion of fishing line 30 is then disposed in the bifurcated end portion 38 of the control arm 36. In this position of the fishing line 30, it will be noted that more or less slack line can be given or taken via manipulation of the reel assembly 32 without effecting a premature release of the detent 40 (or 50). Moreover, it will be seen that in response to a pull applied to the fishing line 30, the control arm will be pivoted in a counterclockwise direction. Accordingly, the end tab 48 will assume a releasing position relative to the guide or eyelet 26 whereat the mechanism detaches resulting in a springback of the rod section 16. Since the fishing line is correspondingly displaced, the fish hook will be automatically set.

While the above described procedure contemplates locating the detent 40 (or 50) in the first guide 26 inwardly from the distal end of the rod 16, it will be appreciated that in the event that it is desired to increase the spring-back force of the pole 12, other inwardly spaced guides could have been utilized. Moreover, the apparatus 10 of the present invention, while being illustrated in combination with a conventional fishing rod, can be easily adapted for use with virtually any type of pole including poles of a relatively short span which are utilized in the art of ice fishing.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:

1. Apparatus for setting a fish hook on the fishing line of a fishing rod which rod includes a handle and a series of eyelets mounted along the rod for supporting and guiding the fishing line and including an eyelet at the distal end of the rod, an eyelet proximate to said distal end eyelet and an eyelet proximate the handle, said apparatus being independent of the support for said rod and comprising a flexible line, means on one end of said flexible line for detachably connecting said flexible line to said eyelet proximate the handle, and means on the other end of said flexible line for releasably engaging said eyelet proximate the distal end of the rod for holding the rod in a desired bowed condition and releasing said eyelet proximate the distal end of the rod in response to a predetermined pull on the fishing line, said last named means comprising a hook member connected to said other end of said flexible line and adapted to releasably hook into said eyelet proximate the distal end of the rod and an arm on said hook member having an outer end adapted to be disposed between said eyelet proximate to the distal end of the rod and said eyelet at the distal end of the rod and in spaced relation to the rod and adapted to have the portion of the fishing line intermediate the distal end eyelet and the eyelet proximate the distal end trained over it so that a predetermined pull on the fishing line moves the arm and the hook to unhook the latter from said eyelet proximate the distal end of the rod.

2. Apparatus for setting a fish hook on the fishing line of a fishing rod as defined in claim 1 including means for varying the effective length of said flexible line.

3. Apparatus for setting a fish hook on the fishing line of a fishing rod as defined in claim 1 wherein said hook member is provided with a plurality of selected portions for selectively connecting said other end of said flexible line thereto for selectively varying the position of said hook member relative to said flexible line.

4. Apparatus for setting a fish hook on the fishing line of a fishing rod as defined in claim 1 including means for adjusting the position of said arm relative to said hook member.

5. Apparatus for setting a fish hook on a fishing line of a fishing rod as defined in claim 1 including means for varying the effective length of said flexible line and means for adjusting the position of said arm relative to said hook member and wherein said hook member is provided with a plurality of selected portions for selectively connecting said other end of said flexible line thereto for selectively varying the position of said hook relative to said flexible line.

* * * * *